United States Patent [19]

Van Kirk

[11] Patent Number: 4,674,665
[45] Date of Patent: Jun. 23, 1987

[54] VEHICLE TOOL BOX WITH PERIPHERAL DRAIN MEANS

[75] Inventor: LeRoy Van Kirk, White Pigeon, Mich.

[73] Assignee: LRV Corporation, Elkhart, Ind.

[21] Appl. No.: 902,364

[22] Filed: Aug. 29, 1986

[51] Int. Cl.$^4$ .................. B65D 43/06; B65D 43/08
[52] U.S. Cl. ...................... 224/273; 220/DIG. 6; 220/356; 224/42.42; 296/37.6; 312/DIG. 33; 206/349
[58] Field of Search ............... 312/DIG.33; 206/349; 224/273, 42.42; 220/I T, DIG. 6, 356; 296/37.6

[56] References Cited

U.S. PATENT DOCUMENTS

| | | | |
|---|---|---|---|
| 3,118,559 | 1/1964 | Stricker, Jr. | 220/DIG. 6 X |
| 4,027,778 | 6/1977 | Tupper | 220/356 X |
| 4,216,990 | 8/1980 | Musgrove et al. | 296/37.6 X |
| 4,288,011 | 9/1981 | Grossman | 224/42.42 |
| 4,488,669 | 12/1984 | Waters | 224/273 |

Primary Examiner—William Price
Attorney, Agent, or Firm—Thomas J. Dodd

[57] ABSTRACT

A tool box which is positioned in and supported by the bed of a pick-up truck. The tool box has a pivoting lid to allow access to the tools and a side located drip rail channel part to prevent entry of moisture into the tool box interior.

5 Claims, 5 Drawing Figures

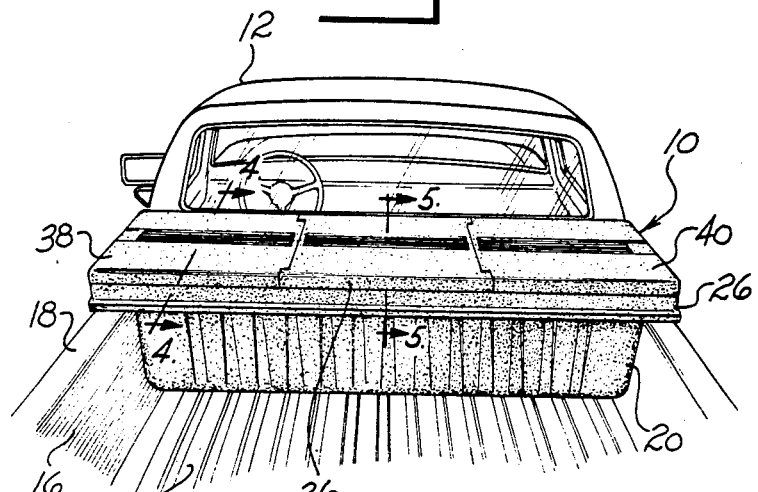
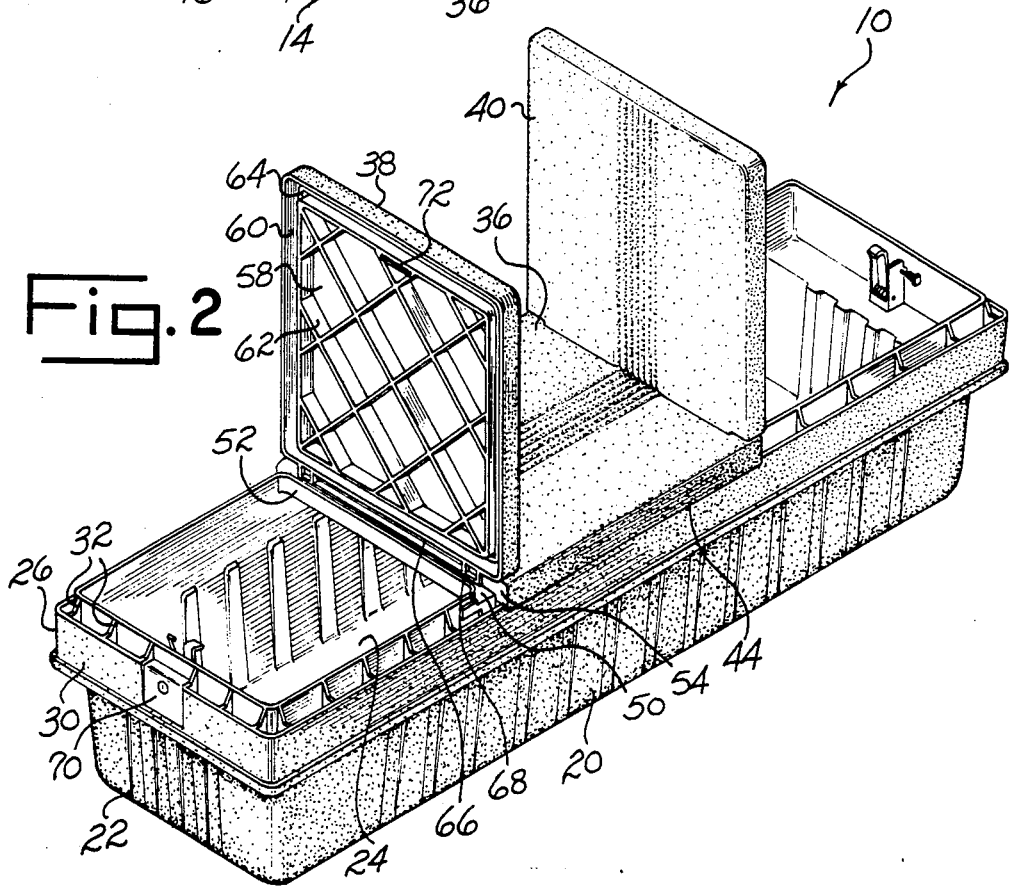

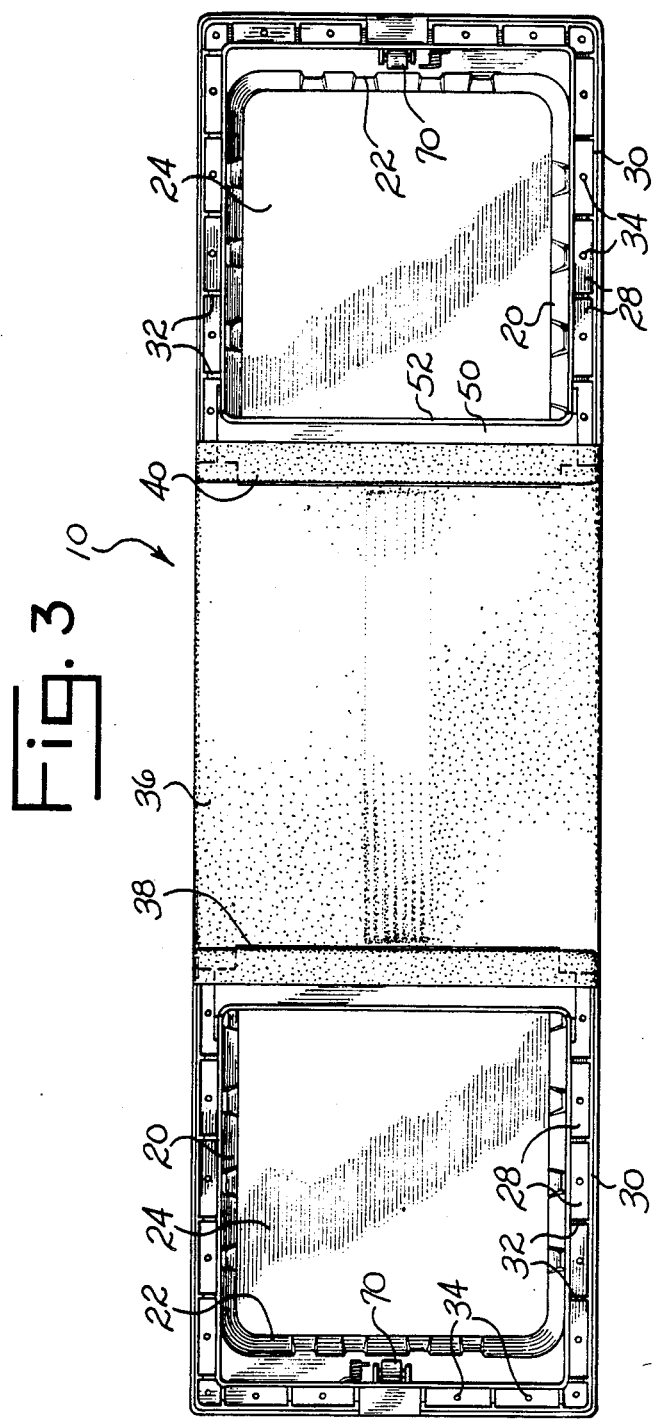

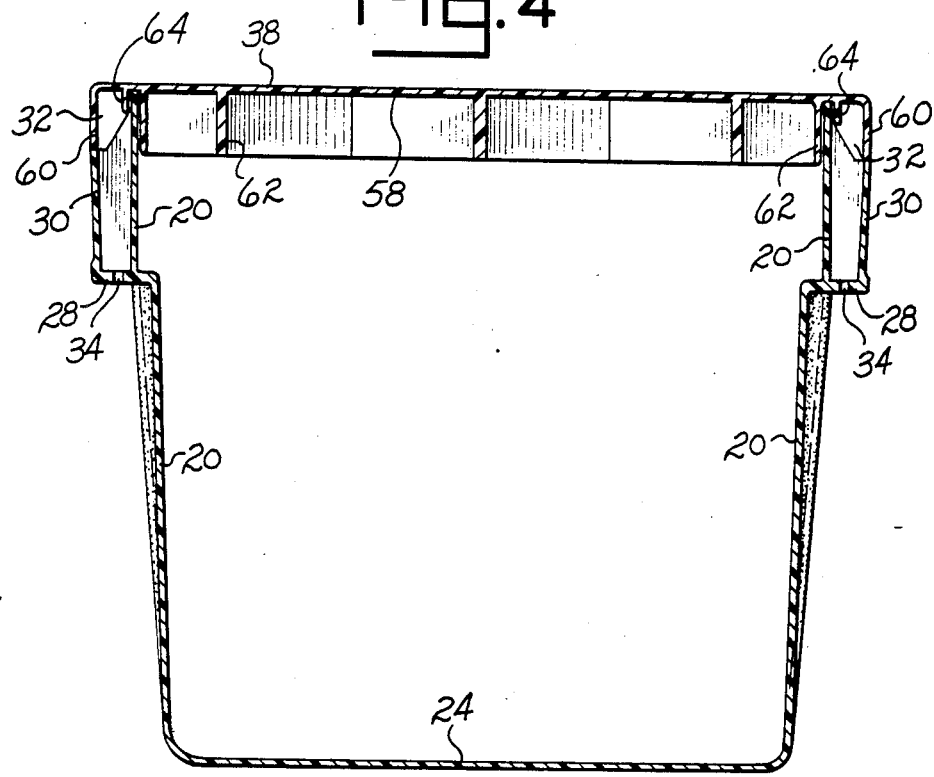
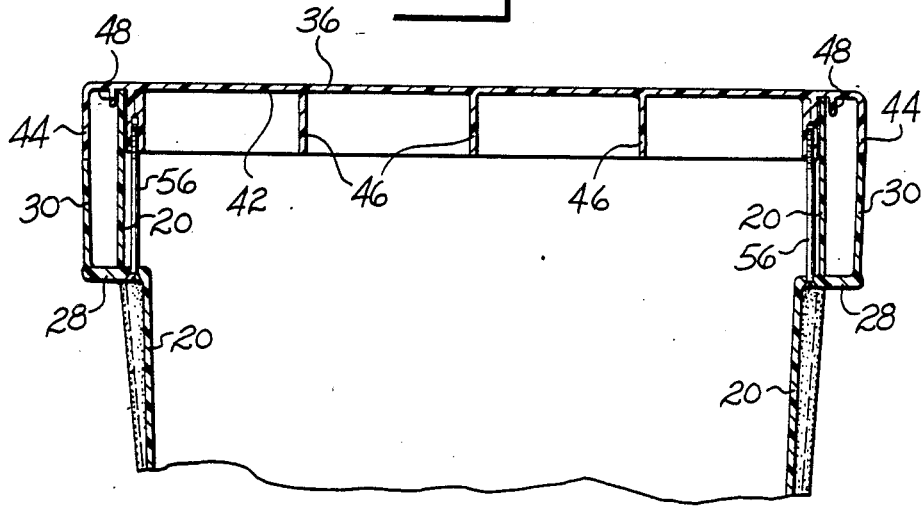

VEHICLE TOOL BOX WITH PERIPHERAL DRAIN MEANS

SUMMARY OF THE INVENTION

This invention relates to a tool box and will have special but not limited application to a portable tool box which is stored in the bed of a pick-up truck.

Portable boxes for storing tools and similar equipment have been produced and sold for some time. Many of these boxes suffer from a common deficiency, that being their tendency to allow rain water and other moisture to enter the box.

The tool box of this invention includes an upper drip rail trough which is positioned along the marginal edge of the tool box. The trough collects moisture from the lid to prevent moisture seepage into the storage compartment where the tools are located.

Accordingly, it is an object of this invention to provide for a substantially leakproof portable tool box.

Another object of this invention is to provide for a tool box which may be supported by the side rails of a pick-up truck bed.

Another object of this invention is to provide for a portable tool box which is durable and is economical to produce and maintain.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a fragmentary perspective view of the tool box as positioned in a truck bed.

FIG. 2 is a perspective view of the tool box with the lid opened and the interior storage boxes shown removed.

FIG. 3 is a top plan view of the tool box with the lid opened.

FIG. 4 is a sectional view taken along line 4—4 of FIG. 1.

FIG. 5 is a sectional view taken along line 5—5 of FIG. 1.

DESCRIPTION OF THE PREFERRED EMBODIMENT

The preferred embodiment herein described is not intended to be exhaustive or to limit the invention to the precise form disclosed. It is chosen and described to explain the principals of the invention, and its application and practical use to thereby enable others skilled in the art to utilize the invention.

Referring now to the drawings, the numeral 10 refers generally to the tool box of this invention. Tool box 10 may be formed of molded plastic and is adapted to be positioned in the bed 14 of pick-up truck 12 as shown in FIG. 1. Truck bed 14 generally includes upstanding side rails 16 which form a horizontal top ledge 18.

Tool box 10 includes a box like housing formed by side walls 20, end walls 22, and bottom wall 24. A continuous channel part forms a trough 26 integrally about the periphery of tool box 10. Trough 26 is characterized by a lower wall part 28 which is connected to box side walls 20 and box end walls 22 and an integral upstanding wall part 30. A plurality of spacers 32 are connected between box side and end walls 20 and 22, and trough upstanding wall part 30 to lend additional strength to trough 26. Trough lower wall part 28 may include a plurality of holes 34 to allow water to drain.

Tool box 10 also includes one or more lids. Three lids 36, 38, and 40 are shown. Lid 36 is formed of the same material as tool box 10 and includes a wall part 42 and side located peripheral downturned lips 44. Formed integral with lid wall part 42 are a plurality of grids 46 which provide additional strength for the lid and a continuous inner lip 48. Lid 36 (as shown in FIGS. 1-3 and 5) is positioned over the central portion of tool box 10 with its peripheral lips 44 abutting trough wall part 30 and its inner lip 48 positioned outwardly of box side wall 22 to form a watertight seal. Lid 36 also includes end located integral lower wall parts 50 from each of which protrudes an upstanding lip 52 as shown in FIGS. 2-3. Box side walls 20 are notched to accommodate wall parts 50 and lips 52 which are fitted tightly against the box side wall to side against leakage. Optionally, a sealant may seal the junction of the lip 52 and box side wall 20. Each corner portion of lid 36 is formed into projecting ears 54 as seen in FIGS. 1-3. Lid 36 is stationarily fastened to box 10 through fixed fasteners such as screws 56.

Lids 38 and 40 are identical in every way and for ease of description only one lid 38 will be described with the understanding that the description will apply equally to lid 40. As with lid 36, lid 38 is formed of the same materials as box 10 and includes an upper wall part 58 and a continuous downturned peripheral lip 60. Formed integral with lid wall part 58 are a plurality of grids 62 which provide additional strength, and a continuous inner lip 64. Lid 38 is swingably connected to lid 36 by a pivot pin 66 which extends through a flange 68 of lid 38 into ears 54 between a closed position (FIG. 1) and an open position (FIG. 2). In the closed position, lid outer lip 60 abuts trough wall part 30 and lid inner lip 64 is positioned outwardly of box side wall 20 to form a watertight seal. A lock 70 may extend through trough wall part 30 and mate with a catch 72 on lid wall 58 to lock box 10 in the closed position.

Tool box 10 is shown stored in the back of pick-up truck 12 in FIG. 1 with lids 36, 38 and 40 in the closed position. Tool box 10 is supported above truck bed 14 by trough lower wall parts 28 which rest atop side rail ledges 18 as shown. When rainwater or other moisture falls between the spaces between lids 36, 38 and 36, 40 it is diverted by lid lower wall 50 and upstanding lip 52 into trough 26 where it drains out through holes 34. Should water accumulate on top of either pivoting lid 38, 40, this water is also directed by wall 50 and lip 52 into trough 26 when the lids are opened. Any moisture which enters through the side seams between lids 36, 38, 40 and trough wall part 30 is directed into the trough 26 by lips 48, 64 and away from the interior of tool box 10.

It is understood the above description does not limit the invention to the given details but may be modified within the scope of the appended claims.

I claim:

1. In a tool box adapted for positioning in the bed of a pick-up truck, said tool box comprising in combination a receptacle having interconnected side and end walls and a bottom wall to form a storage compartment having a top opening, a removable lid covering said storage compartment top opening, said receptacle side walls including an integral marginal trough-forming channel part extending downwardly and outwardly of the receptacle side walls, said channel part constituting means for catching moisture from said removable lid to prevent entry of the moisture into said storage compartment.

2. The tool box of claim 1 wherein said channel part includes a bottom wall having a drain bore extending therethrough.

3. The tool box of claim 1 wherein said channel part is continuous and integral with said receptacle end walls.

4. The tool box of claim 3 and a second lid covering a portion of said storage compartment top opening, said first mentioned lid pivotally connected to said second lid at an end edge of the second lid, said second lid including a lower wall part and an upstanding lip positioned adjacent said end edge for deflecting moisture from said first mentioned lid away from said storage compartment towards said channel part as the first mentioned lid is pivoted towards an open position.

5. The tool box of claim 4 wherein said first mentioned lid includes a wall part and a continuous downturned peripheral lip, said first mentioned lip abutting said channel part when the lid is in a closed position, said first mentioned lid also including a continuous downturned lip spaced from said peripheral lip, said downturned lip abutting with said receptacle side wall when the lid is in its said closed position wherein said receptacle is completely sealed against entry of moisture.

* * * * *